(12) United States Patent
Meier et al.

(10) Patent No.: US 9,868,507 B2
(45) Date of Patent: Jan. 16, 2018

(54) AIRCRAFT HAVING KEEL TUBE WITH STRUCTURE THAT REDUCES NOISE EMISSIONS

(71) Applicant: AutoGyro AG, Herisau (CH)

(72) Inventors: Gerhard T. Meier, Bad Zurzach (CH); Otmar Birkner, Hildesheim (DE)

(73) Assignee: AutoGyro AG, Herisau (CH)

( * ) Notice: Subject to any disclaimer, the term of this patent is extended or adjusted under 35 U.S.C. 154(b) by 68 days.

(21) Appl. No.: 14/896,008

(22) PCT Filed: Mar. 25, 2015

(86) PCT No.: PCT/EP2015/056328
§ 371 (c)(1),
(2) Date: Dec. 4, 2015

(87) PCT Pub. No.: WO2015/165651
PCT Pub. Date: Nov. 5, 2015

(65) Prior Publication Data
US 2016/0129988 A1 May 12, 2016

(30) Foreign Application Priority Data

Apr. 29, 2014 (DE) .................. 10 2014 006 112

(51) Int. Cl.
*B64C 1/40* (2006.01)
*B64C 27/02* (2006.01)
(Continued)

(52) U.S. Cl.
CPC ............ *B64C 1/40* (2013.01); *B64C 27/02* (2013.01); *B64C 27/52* (2013.01);
(Continued)

(58) Field of Classification Search
CPC ........... B64C 1/40; B64C 27/22; B64C 39/04; B64C 11/00; B64C 27/02; B64C 27/52;
(Continued)

(56) References Cited

U.S. PATENT DOCUMENTS 2,252,256 A * 8/1941 Harris ..................... B64C 11/00
181/247
2,323,394 A * 7/1943 Harris ..................... B63H 5/14
181/247
(Continued)

FOREIGN PATENT DOCUMENTS

DE   102009015805 A1 * 10/2010 ........... B64C 27/024
DE   102010021022 A1   11/2011
(Continued)

*Primary Examiner* — Tien Q Dinh
*Assistant Examiner* — Alexander V. Giczy
(74) *Attorney, Agent, or Firm* — Whitham, Curtis & Cook, P.C.

(57) ABSTRACT

An aircraft such as a gyroplane has a thrust propeller, a tail unit, a fuselage, and a keel tube that links the tail unit to the fuselage. The keel tube has a structure that reduces sound. The sound-reducing structure has a flow line-shape, is arranged at least partly below the thrust propeller, and extends from the keel tube in directions normal a vertical longitudinal plane of the gyroplane. The sound-reducing structure may extend asymmetrically from the keel tube and may be located along the longitudinal axis of the gyroplane on the keel tube within an angle between 10 degrees forward and 30 degrees rearward a vertical line extending to the keel tube from the intersection of the thrust propeller rotational axis and the thrust propeller rotational plane. The sound-reducing structure may also contain a sound-absorbent material or may comprise a hollow body with several openings.

11 Claims, 4 Drawing Sheets

(51) Int. Cl.
*B64C 27/52* (2006.01)
*B64C 27/82* (2006.01)

(52) U.S. Cl.
CPC .. *B64C 2027/8236* (2013.01); *B64C 2220/00* (2013.01); *Y02T 50/46* (2013.01)

(58) Field of Classification Search
CPC ........ B64C 2027/8236; B64C 2220/00; B64D 2033/0206
See application file for complete search history.

(56) References Cited

U.S. PATENT DOCUMENTS

| | | | | |
|---|---|---|---|---|
| 2,581,625 | A * | 1/1952 | Brady | B64C 11/00 244/119 |
| 2,929,586 | A * | 3/1960 | Hurd, Jr. | B64C 11/00 181/207 |
| 3,890,060 | A * | 6/1975 | Lipstein | F02K 1/827 181/214 |
| 4,010,919 | A | 3/1977 | Breuner | |
| 4,653,705 | A * | 3/1987 | Bensen | B64C 27/02 244/17.11 |
| 4,815,995 | A * | 3/1989 | Ingvason | B63B 39/005 114/61.29 |
| 5,041,323 | A * | 8/1991 | Rose | B32B 3/12 181/292 |
| 5,098,033 | A * | 3/1992 | Haseloh | B64C 27/52 244/17.27 |
| 5,727,754 | A | 3/1998 | Carter, Jr. | |
| 6,062,508 | A | 5/2000 | Black | |
| 6,824,093 | B1 * | 11/2004 | Haseloh | B64C 27/024 244/17.11 |
| 7,971,684 | B2 * | 7/2011 | Gantie | F02C 7/24 181/284 |
| 8,070,092 | B2 * | 12/2011 | Bouldin | B64C 27/20 244/34 A |
| 9,623,952 | B1 * | 4/2017 | Jones | B64C 1/40 |
| 2002/0036115 | A1 * | 3/2002 | Wilson | B32B 3/20 181/292 |
| 2006/0169533 | A1 * | 8/2006 | Patrick | B64D 33/02 181/210 |
| 2007/0272796 | A1 * | 11/2007 | Stuhr | B64C 11/001 244/54 |
| 2008/0296431 | A1 * | 12/2008 | Ivers | B64D 33/02 244/1 N |
| 2009/0152400 | A1 | 6/2009 | Verde Preckler et al. | |
| 2010/0001120 | A1 | 1/2010 | Sun | |
| 2010/0213002 | A1 * | 8/2010 | Oboodi | B32B 5/02 181/290 |
| 2012/0025011 | A1 | 2/2012 | Hsueh | |
| 2013/0099065 | A1 | 4/2013 | Stuhlberger | |
| 2014/0070051 | A1 * | 3/2014 | Kreitmair-Steck | B64C 27/82 244/1 N |
| 2015/0125268 | A1 * | 5/2015 | Koopmann | B64C 11/001 415/119 |

FOREIGN PATENT DOCUMENTS

| | | |
|---|---|---|
| EP | 2279943 A1 | 2/2011 |
| EP | 2719621 A2 | 4/2014 |
| WO | 2012064344 A1 | 5/2012 |

* cited by examiner

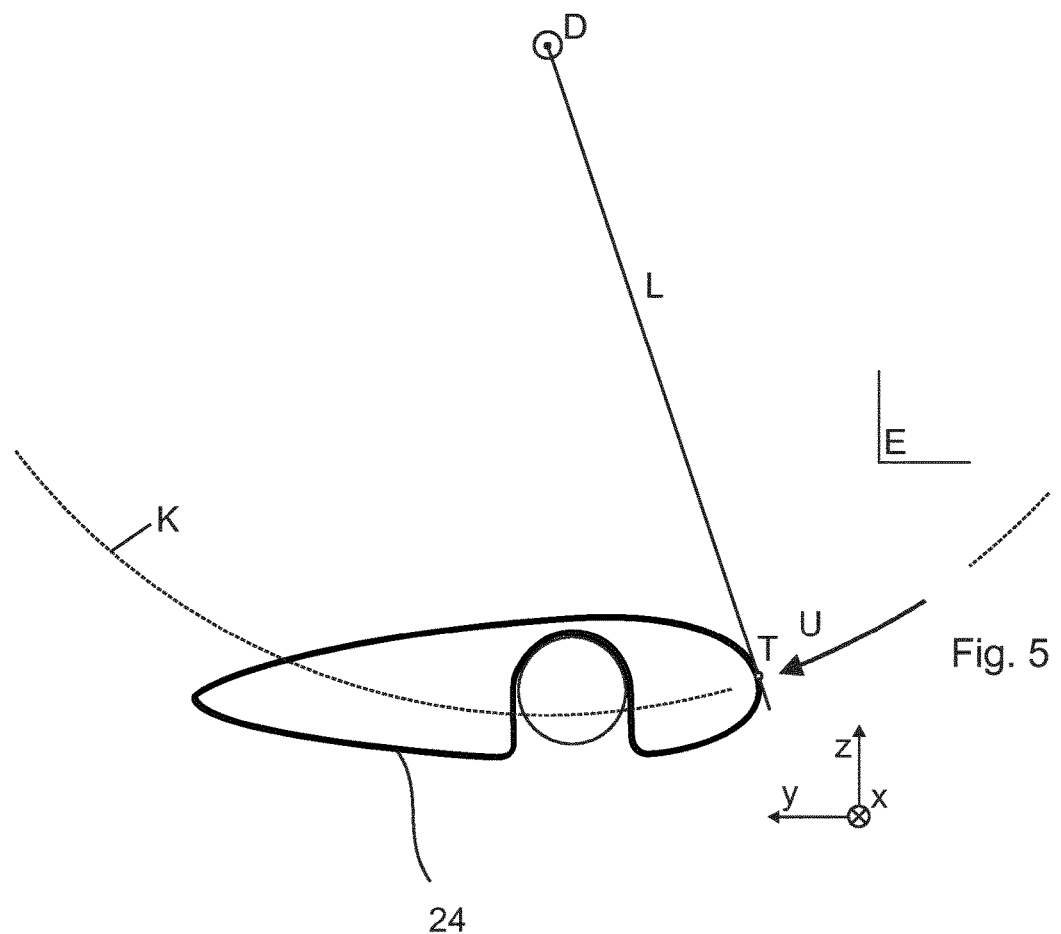

AIRCRAFT HAVING KEEL TUBE WITH STRUCTURE THAT REDUCES NOISE EMISSIONS

The invention relates to an aircraft with a thrust propeller, a tail unit and a connection by means of which the tail unit is fastened.

Aircraft, such as, for example, gyroplanes, such as are known, for example, from DE 10 2009 040 278 A1 and DE 10 2008 044 461 A1, emit sound, which is undesirable. Attempts are therefore made to reduce sound emissions. The sound-protection measures should influence the flight properties of the gyroplane as little as possible and moreover not lead to any or only to a small additional weight. It has become apparent that this is difficult to achieve.

DE 298 18 392 U1 discloses a gyroplane, the thrust propeller of which is surrounded by an annular wing so that an impeller is produced. The comparatively high weight is disadvantageous in such a gyroplane so that the load capacity is reduced.

DE 42 42 332 A1 discloses arranging sound reflectors below the drive unit of flying devices so that sound is reflected away from the ground. Such a sound-reflection device requires a lot of space and also reduces the load capacity.

The object on which the invention is based is to improve the sound protection in an aircraft.

The invention solves the problems by means of a generic aircraft in which the connection has a sound-absorbing structure. The invention also solves the problem by means of the use of a noise absorber on the keel tube of a gyroplane.

It is advantageous in the aircraft according to the invention that sound emissions, i.e. the sound impact which an aircraft has on its surroundings, can be reduced with simple means. It has namely been shown that a significant part of the noise immission is caused by noise emissions of the aircraft when it is on the ground or close to the ground. The reason for this is that in this case the distance between the gyroplane and a person is smaller than when the gyroplane is at flying height. It has also become apparent that a significant part of the noise is caused by the interaction of rotor blade tip vortices, which are caused by the thrust propeller, with the connection, wherein the mechanism of noise generation is not yet understood in detail. The noise caused in this manner is reduced by the invention.

It has surprisingly been shown that changes to the thrust propeller only have a relatively small influence on the noise development of the aircraft, in particular a gyroplane, in particular on the ground. In contrast, a sound-absorber structure at the connection, for example, at the keel tube, brings about a noticeable reduction in sound emissions. This finding is surprising because it was expected that noise which is caused by the complex interaction between a rotor blade tip vortex generated by the propeller and the connection cannot be reduced by simple means. On the contrary, it is expected that—as in the case of a helicopter—the noise is primarily caused by an interaction of the propeller tips with the rotor blade tip vortex which was generated by the propeller tip running ahead in the direction of rotation. It has, however, become apparent that this is not the case.

In the context of the present description, the term aircraft refers in particular to a gyroplane or a fixed wing aircraft.

The term thrust propeller refers to a propeller which is arranged behind the cockpit in the direction of flight of the gyroplane. Of course, it is possible that the gyroplane has more than one thrust propeller. It is possible that the thrust propeller is not arranged directly behind the cockpit, rather, for example, laterally offset therefrom. The key issue is that rotor blade tip vortices strike the keel tube and cause audible noise there.

In particular, the thrust propeller is arranged to be freestanding. In particular, this is to be understood such that it is uncovered and in particular not formed as an impeller.

The term connection refers to a structure, in particular a tube, which connects a fuselage of the aircraft to a tail unit. It is possible, but not necessary, that the connection is composed of a different material to the fuselage of the gyroplane.

The term keel tube refers in particular to a tube which runs along an imaginary keel line. In particular, the keel tube is fitted in a lower region of the fuselage. It is possible and represents a preferred embodiment that the keel tube has an elliptical, in particular circular cross-section, but this is not necessary. For example, the cross-section can also be polygonal. It is also possible that the cross-section changes along a longitudinal extension of the keel tube.

It is possible, but not necessary, that the connection is connected to the fuselage, i.e. that a joint is present between these. It is also possible that the connection is formed by an extension of the fuselage. In this case, the connection can be connected in one piece to a component of the fuselage, for example, an outer shell of the fuselage.

It is possible, but not necessary, and represents an embodiment that the connection is at least partially hollow. It is also possible that the connection is constructed from solid material.

It is preferred, although not necessary that the connection is constructed from metal or comprises metal. Known aircraft, in particular gyroplanes, often possess a connection, in the case of the gyroplane a keel tube, composed of metal, since metal possesses a high strength and damage due to ageing can be easily identified.

Alternatively or additionally, the connection can, however, also be constructed at least partially from a non-metallic material. For example, the connection can have a supporting, preferably tubular structure composed of fiber-reinforced plastic, for example, fiber glass-reinforced and/or carbon fiber-reinforced plastic. This is particularly advantageous if—as provided in the case of a preferred embodiment—the fuselage also possesses an outer shell of fiber-reinforced plastic.

It is possible, but not necessary that the connection possesses at least partially an oval and/or ellipsoid and/or circular cross-section. A circular cross-section is generally advantageous since such keel tubes are easy to manufacture.

The feature that the connection, in particular the keel tube, has a sound-absorbing structure is to be understood in particular such that the connection is formed so that it exhibits a sound emission at a distance of 5 meters which is lower by at least 5 dB(a) in comparison to a connection with a circular cross-section at a rotational frequency of the thrust propeller of 2000 revolutions per minute than a connection without the sound-absorbing structure.

If the sound-absorbing structure is not formed as a separate component connected to the connection, in particular only the region the width of which is at least 1.5 times, preferably at least double the width of the connection, in the case of a keel tube therefore a keel tube width, is considered as a sound-absorbing structure. The width of the sound-absorbing structure and the width of the connection, in particular the keel tube width, are determined in each case by perpendicular projection onto the horizontal plane.

The connection preferably runs along a rotational axis of the thrust propeller. This is to be understood in particular such that, along a longitudinal axis of the aircraft at the level of a propeller plane, an angle between the rotational axis of the thrust propeller and the connection is in terms of magnitude at most 30°, in particular at most 20°.

According to one preferred embodiment, the aircraft is a gyroplane. The connection is then preferably a keel tube.

According to one preferred embodiment, the sound-absorbing structure is arranged at least also below the thrust propeller. It has surprisingly been shown that an interaction between rotor blade tip vortex and the keel tube also arises to a large extent underneath the thrust propeller. It would be expected that these rotor blade tip vortices are propelled by the air flow which is generated by the thrust propeller in the direction of the tail of the gyroplane so that they strike the keel tube further in the tail direction. It has, however, become apparent that significant noise is also generated precisely below the thrust propeller. The generation of noise in the region is reduced by the sound-absorbing structure.

The noise-damping structure is preferably formed at least in a sound absorber region (or exclusively in a sound absorber region) along a longitudinal axis of the aircraft, wherein the sound absorber region is formed by all such points of the connection for which it applies that a connecting line of the respective point lies at an angle interval of −10° to 30° with a point of intersection from the thrust propeller rotational axis and a propeller plane in which the propeller rotates. A negative angle means that the angle is oriented towards the cockpit. It has been shown that in this manner a good compromise can be achieved between the additional weight of the aircraft on one hand and the reduction in sound emissions which can be achieved on the other hand.

If the aircraft is a gyroplane, the sound-absorbing structure is preferably at least also, but preferably exclusively, formed in a sound absorber region along a longitudinal axis of the gyroplane, wherein the sound absorber region is formed by all such keel tube points of the keel tube for which it applies that a connecting line of the respective keel tube point lies at an angle interval of −10° to 30° with a point of intersection from the thrust propeller rotational axis and a propeller plane in which the propeller rotates. A negative angle means that the angle is oriented towards the cockpit. It has been shown that in this manner a good compromise can be achieved between the additional weight of the gyroplane on one hand and the reduction in sound emissions which can be achieved on the other hand.

The sound-absorbing structure is preferably asymmetrical relative to a vertical longitudinal plane of the gyroplane. This vertical longitudinal plane runs strictly vertically and through the geometrical center of gravity of the keel tube. The sound-absorbing structure is preferably formed to be flow line-shaped in terms of an incident flow with air in the horizontal direction transverse to the longitudinal axis. The sound-absorbing structure offers particularly low resistance to the wind flow which is caused by the thrust propeller. The curvature of the sound-absorbing structure at the incident flow-side end is preferably smaller than at the outflow-side end.

It is possible and represents a preferred embodiment that the sound-absorbing structure is formed at least also by the cross-section of the connection between tail unit and fuselage, in particular of the keel tube.

According to one preferred embodiment, the sound-absorbing structure has a coefficient of drag $c_w$ of at most 0.25, in particular 0.20 in relation to an incident flow with air, for example, with a flow speed of 30 km/h, in the circumferential direction of the thrust propeller in relation to the foremost point of the sound-absorbing structure in the direction of flow. Incident flow in the circumferential direction refers to an incident flow in the propeller plane in which the thrust propeller rotates or a plane parallel thereto. The determination of the incident flow direction is described below with reference to FIG. 5. As a result of the low coefficient of drag, only a small interaction arises between air vortices from the thrust propeller and the connection, which reduces noise emissions.

The sound-absorbing structure particularly preferably has a coefficient of drag of at most 0.25, in particular of at most 0.20 in relation to an incident flow with air in the horizontal direction along the propeller plane, for example, with a flow speed of 30 km/h. The coefficient of drag is measured in that a laminar flow in the indicated direction flows against the sound-absorbing structure and the force is determined which this air flow exerts on the sound-absorbing structure. The coefficient of drag is calculated according to the formula $$c_w = \frac{2F_w}{\rho A v_f^2}$$

wherein $F_w$ is the resistance, $\rho$ the density of the air, $v_f$ the speed of the air (in the present case therefore $v_f$=30 km/h) and A the end face of the sound-absorbing structure. In this manner, fluctuations in speed lead, as a result of vortices, to a small resultant force on the keel tube and to less noise.

If the aircraft is a gyroplane, the sound-absorbing structure is preferably formed at a connection between a fuselage and the tail unit. In particular, this connection, which can involve a keel tube or two fixing struts, is formed so that a coefficient of drag is at most 0.25, in particular at most 0.20 in relation to an incident flow with air in a circumferential direction of the thrust propeller.

It is particularly expedient if the sound-absorbing structure possesses a width B, which is measured perpendicular to the longitudinal axis of the gyroplane, wherein this width is at least 10 cm. It is expedient if width B is smaller than 50 cm. The width is measured in particular in the direction which runs perpendicular to the shortest connecting line between the sound-absorbing structure and the thrust propeller rotational axis of the thrust propeller.

The sound-absorbing structure also preferably possesses a length T along longitudinal axis L of the gyroplane, wherein length T is preferably greater than 20 cm. It is also expedient if length T is less than 80 cm.

According to a preferred embodiment, a ratio of width to height is greater than two, in particular greater than four. The height runs perpendicular to the width and the length.

The sound-absorbing structure preferably contains a sound-absorbent material. The sound-absorbent material can involve a non-woven material, mineral wool and/or metal wool. It is particularly expedient if the sound-absorbing structure comprises a hollow body which has several openings. The sound-absorbent material is preferably arranged in the hollow body. A hollow body refers to a body which is formed so that a non-woven material can be arranged therein so that it does not fall out during flight of the gyroplane.

Alternatively or additionally, the sound-absorbing structure can have a plurality of openings.

It is particularly expedient if the sound-absorbing structure is formed on the keel tube, wherein the keel tube has a plurality of openings and/or contains a sound-absorbent material. In this case, a further component is omitted, although manufacture of such a sound-absorbing structure is more complex. The term sound-absorbent material refers in particular to a fibrous material, for example, glass or stone wool.

The sound-absorbing structure is preferably formed as a passive sound absorber. In other words, it is possible and preferred, although not necessary, that the sound-absorbing structure is formed by a component which is separate from the keel tube. The sound absorber can be connected detachably or non-detachably to the keel tube. It is possible that this connection is formed in an adhesively bonded, frictionally engaged or positive locking manner.

It is expedient if the hollow body is manufactured from plastic. A simultaneously lightweight, robust sound absorber which is easy to produce is produced.

The invention is explained below in greater detail on the basis of the enclosed drawings. In the drawings.

Figure 1:
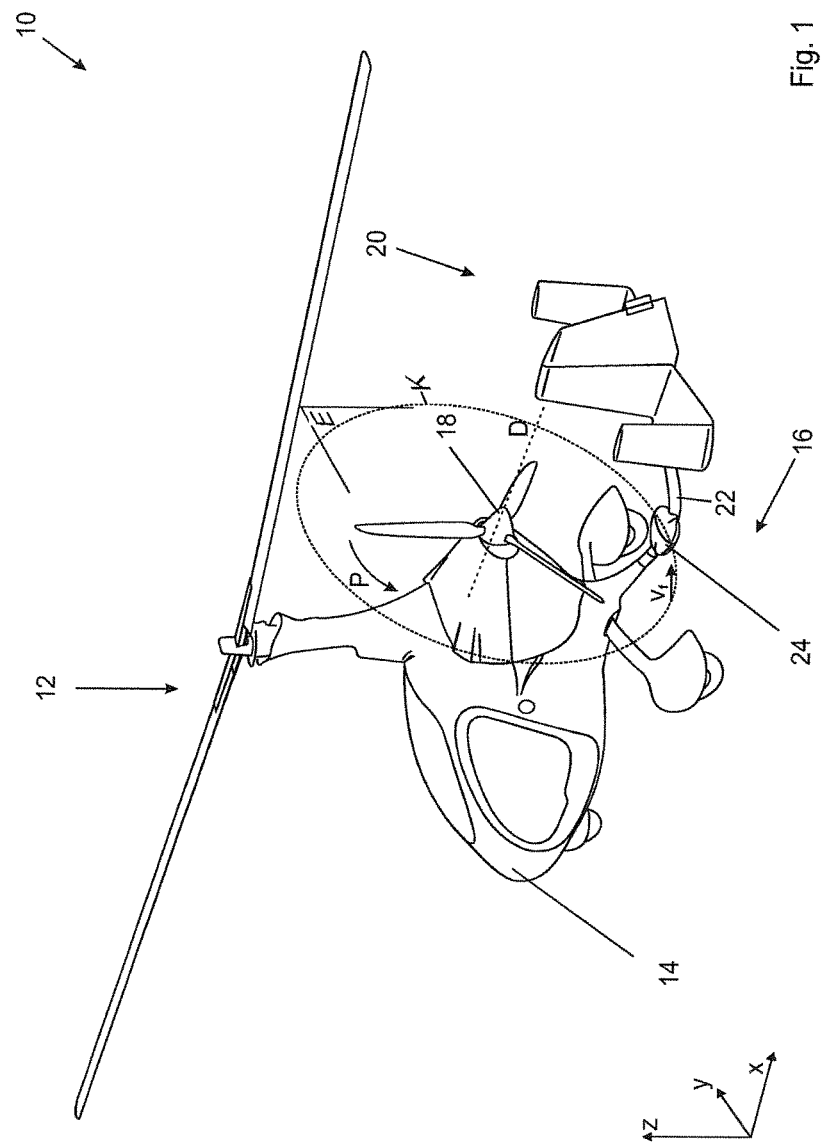
FIG. 1 shows a perspective view of a gyroplane according to the invention.
Figure 3:
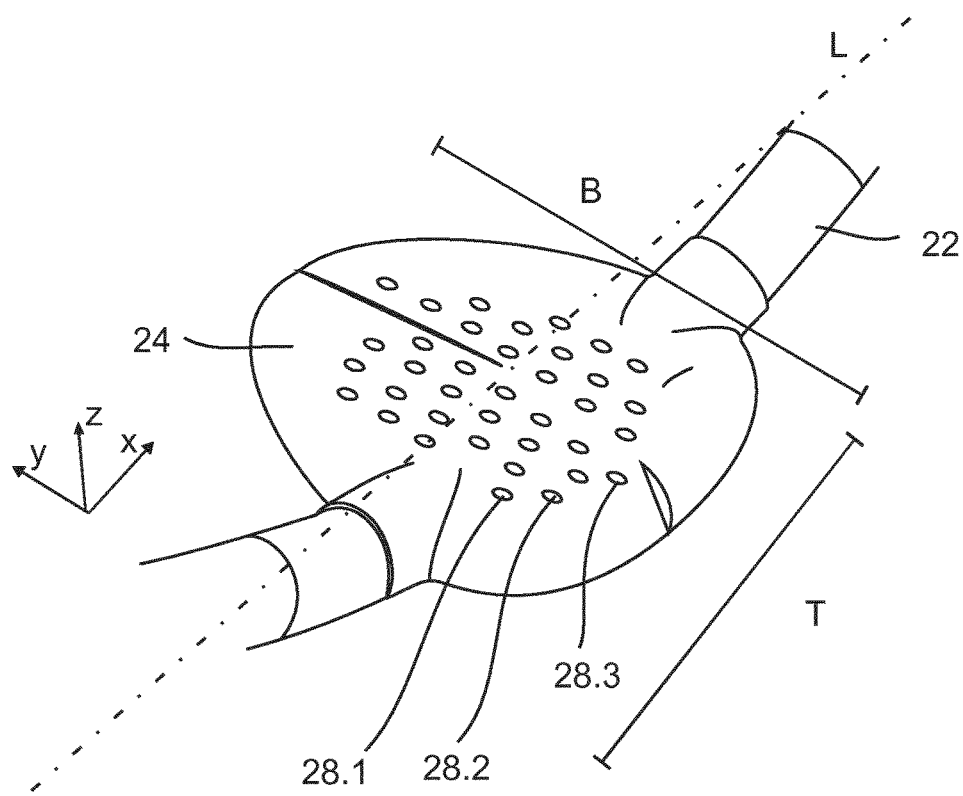
Figure 4:
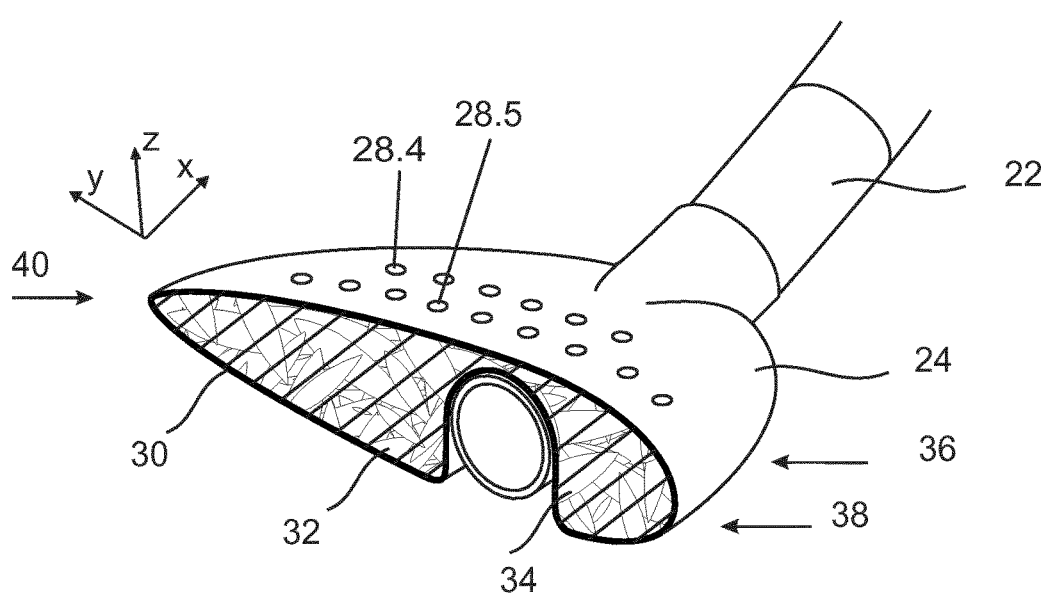

FIG. 3 shows a detailed view of a sound-absorbing structure according to the invention in the form of a sound absorber and FIG. 4 shows a cross-section through the sound absorber according to FIG. 3, FIG. 5 schematically shows the incident flow conditions at the sound-absorbing structure, FIG. 1 shows an aircraft 10, here in the form of a gyroplane 10, with a rotor 12, a fuselage 14, an undercarriage 16 and a thrust propeller 18. Gyroplane 10 also possesses a tail unit 20 which is connected to fuselage 14 by means of a connection 22, in the present case in the form of a keel tube 22.

Thrust propeller 18 rotates during operation in a clockwise direction in relation to the viewing direction from tail unit 20 in the direction of fuselage 14, as is indicated by arrow P. The rotation of thrust propeller 18 leads to an air flow which moves away from thrust propeller 18 helically as a first approximation, as is indicated by schematically indicated speed arrows $v_f$. Keel tube 22 has a sound-absorbing structure 24 which in the present case is formed as a sound absorber.

Figure 2:
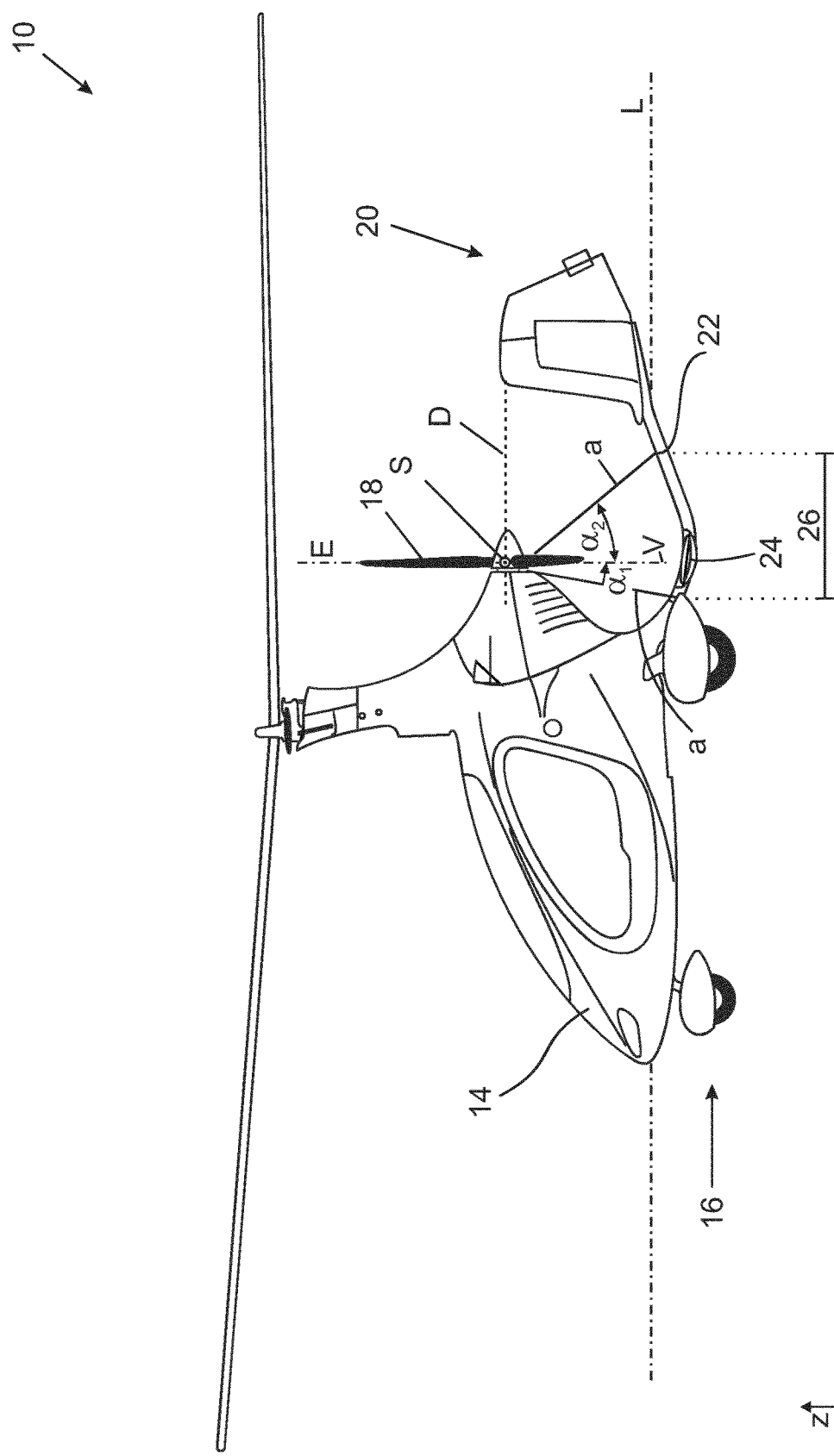
FIG. 2 shows a side view of the gyroplane according to FIG. 1.

FIG. 2 shows gyroplane 10 in a side view. A propeller plane E in which propeller 18 rotates is plotted. Propeller plane E stands perpendicular on the paper plane. It is apparent that sound absorber 24 is arranged below thrust propeller 18. In the present case, propeller plane E intersects noise damper 24.

Sound absorber 24 lies in a sound absorber region 26. Said sound absorber region 26 is defined by the points of keel tube 22, connecting line a of which with a point of intersection S of a propeller rotational axis D with propeller plane E runs at an angle α to vertical V, wherein angle α lies at an angle interval I=[$α_1$=−10°, . . . , $α_2$=30°]. If the angle α increases, the connecting line ends at a point further towards the tail unit 20. In particular, sound-absorbing structure 24 is no longer formed in tail unit 20.

FIG. 3 shows sound absorber 24 in a detailed view. Sound absorber 24 has a width B which is measured perpendicular to longitudinal axis L of gyroplane 10. Width B lies in the region between 10 cm and 50 cm. A length T, which is measured along longitudinal axis L, preferably lies between 30 and 80 cm.

It is apparent that sound absorber 24 has a plurality of openings 28.1, 28.2, . . . . In the present case, these are oval, but can also be formed to be at least partially elongate and/or slot-like and/or at least partially round or have a different shape.

FIG. 4 shows a cross-section through sound absorber 24 in relation to a plane which runs perpendicular to a local longitudinal axis of keel tube 22. It is apparent that sound absorber 24 comprises a hollow body 30, therefore an object which possesses an outer shell which delimits an inner space. Inner space 32 is filled with sound-absorbent material 34, in the present case with stone wool. Sound enters into inner space 32 through openings 28 (reference signs without a number suffix designate in each case all corresponding objects) and hits the sound-absorbent material and is thus absorbed.

FIG. 4 also shows that noise damper 24 engages around keel tube 22 so that keel tube 22 lies in the lee in relation to an air flow 36 which is generated by thrust propeller 18 (cf. FIG. 2). The air flow at least primarily strikes noise damper 24. Sound-absorbing structure 24, in the present case therefore sound absorber 24, has an outer contour which is formed so that sound absorber 24, in relation to an incident flow with air flow 36, which flows in the horizontal direction and along propeller plane E (cf. FIG. 2) against noise damper 24, leads to a coefficient of drag $c_w$ which is at most 0.25. The term incident flow along the propeller plane refers to an air flow which runs either in propeller plane E or in a plane parallel thereto.

In order to achieve this low coefficient of drag, sound absorber 24 is formed to be flow line-shaped. It possesses at an incident flow-side end 38 a smaller curvature than at its outflow-side end 40.

Instead of a gyroplane, the invention can also be realized in a fixed wing aircraft which has supporting surfaces instead of rotor 12. The supporting surfaces are fastened, for example, to the fuselage and arranged in front of thrust propeller 18.

FIG. 5 shows a cross-section through sound-absorbing structure 24. An incident flow with air in a circumferential direction U of the thrust propeller is indicated. Partially plotted circle K has its center point on thrust propeller rotational axis D. Circle K has a radius which is selected so that an imaginary line L in propeller plane E (cf. FIG. 1) through thrust propeller rotational axis D, which is tangent to sound-absorbing structure 24 from the side at a point T from which the air is supplied from the thrust propeller, intersects circle K precisely at point T. The coefficient of drag is at most 0.25 in relation to an air flow in thus determined circumferential direction U. An even smaller coefficient of drag is advantageous.

LIST OF REFERENCE NUMBERS

10 Gyroplane
12 Rotor
14 Fuselage
16 Travel path
18 Thrust propeller
20 Tail unit
22 Keel tube
24 Sound absorber structure
26 Sound absorber region
28 Opening
30 Hollow body
32 Inner space
34 Sound-absorbent material 36 Air flow
38 Incident flow-side end
40 Outflow-side end
α Angle
a Connecting line
B Width
D Thrust propeller rotational axis
E Propeller plane
I Angle interval
P Arrow
S Point of intersection
T Length
V Vertical
K Circle

The invention claimed is:

1. A gyroplane, comprising:
   (a) a thrust propeller,
   (b) a tail unit,
   (c) a fuselage, and
   (d) a keel tube that links the tail unit to the fuselage,
   (e) wherein the keel tube comprises a sound-reducing, flow line-shaped structure, wherein the sound-reducing structure is arranged at least partly below the thrust propeller, and wherein the sound-reducing structure extends from the keel tube in directions normal to a vertical longitudinal plane of the gyroplane.

2. The gyroplane as claimed in claim 1, wherein the sound-reducing structure extends asymmetrically relative to the vertical longitudinal plane of the gyroplane.

3. The gyroplane as claimed in claim 1,
   wherein a point of intersection exists at which the thrust propeller rotational axis intersects a propeller plane in which the thrust propeller rotates;
   wherein a first angle is formed between a vertical line extending vertically from the point of intersection to the keel tube and a first line extending from the point of intersection to a first point on the keel tube toward the front of the gyroplane, the first angle having a negative value as measured from the vertical line;
   wherein a second angle is formed between the vertical line and a second line extending from the point of intersection to a second point on the keel tube toward the rear of the gyroplane, the second angle having a positive value as measured from the vertical line;
   wherein the sound-reducing structure is located in a region of the keel tube that is
   i) along a longitudinal axis of the gyroplane, and
   ii) between the first point of the keel tube and the second point of the keel tube such that the first angle is −10° and the second angle is 30°.

4. The gyroplane as claimed in claim 1, wherein
   the thrust propeller has a propeller plane in which the thrust propeller rotates, and
   the sound-reducing structure has a coefficient of drag of at most 0.25 in relation to an incident flow produced by the thrust propeller in the propeller plane when the gyroplane is flying at a predetermined altitude and the thrust propeller is operating at a predetermined speed.

5. The gyroplane as claimed in claim 4, wherein the coefficient of drag of the sound-absorbing structure is at most 0.20.

6. The gyroplane as claimed in claim 4, wherein a cross-section of the sound-reducing structure is different from a cross-section of the keel tube.

7. The gyroplane as claimed in claim 4, wherein the sound-reducing structure is wider than a width of the keel tube.

8. The gyroplane as claimed in claim 4, wherein the sound-reducing structure has a leading edge at an incident flow-side end and a trailing edge at an end opposite the leading edge, wherein a radius of curvature of the leading edge is larger than a radius of curvature of the trailing edge.

9. The gyroplane as claimed in claim 1, wherein the sound-reducing structure contains a sound-absorbent material.

10. The gyroplane as claimed in claim 1, wherein the sound-reducing structure comprises a hollow body which has several openings.

11. The gyroplane as claimed in claim 1, wherein the sound-reducing structure is configured as a passive sound absorber.

* * * * *